US006912206B1

United States Patent
Valentine et al.

(10) Patent No.: US 6,912,206 B1
(45) Date of Patent: Jun. 28, 2005

(54) DISCOVERY OF PHONES ON A NETWORK, SUCH AS A LAN

(75) Inventors: Simon Peter Valentine, Hemel Hempstead (GB); Christopher Robert Linzell, St Albans (GB); Lee Anthony Walker, Watford (GB); Russell Kennett Bulmer, Hemel Hempstead (GB)

(73) Assignee: 3Com Corporation, Santa Clara, CA (US)

( * ) Notice: Subject to any disclaimer, the term of this patent is extended or adjusted under 35 U.S.C. 154(b) by 797 days.

(21) Appl. No.: 09/662,532

(22) Filed: Sep. 15, 2000

(30) Foreign Application Priority Data

Apr. 7, 2000 (GB) .............................................. 0008671

(51) Int. Cl.[7] .............................................. H04L 12/28
(52) U.S. Cl. ........................ 370/255; 370/353; 370/392
(58) Field of Search ................................ 370/254–255, 370/352–353, 390, 392, 401; 709/220, 223

(56) References Cited

U.S. PATENT DOCUMENTS

| 6,108,702 | A | * | 8/2000 | Wood | 709/224 |
|---|---|---|---|---|---|
| 6,377,987 | B1 | * | 4/2002 | Kracht | 709/220 |
| 6,442,144 | B1 | * | 8/2002 | Hansen et al. | 370/255 |
| 6,556,564 | B2 | * | 4/2003 | Rogers | 370/352 |
| 6,587,440 | B1 | * | 7/2003 | Dawes | 370/255 |
| 6,594,696 | B1 | * | 7/2003 | Walker et al. | 709/223 |
| 6,658,020 | B1 | * | 12/2003 | Isaka et al. | 370/466 |

FOREIGN PATENT DOCUMENTS

GB 2 350 034 11/2000

* cited by examiner

*Primary Examiner*—Chau Nguyen
*Assistant Examiner*—Nittaya Juntima
(74) *Attorney, Agent, or Firm*—Michaelson & Associates; Peter L. Michaelson

(57) ABSTRACT

In a computer network, a process for discovering devices in the network, including network phones, and constructing a topological map of the network; and associated apparatus for retrieving an icon relating to the phones and displaying the map including the phones therein.

13 Claims, 4 Drawing Sheets

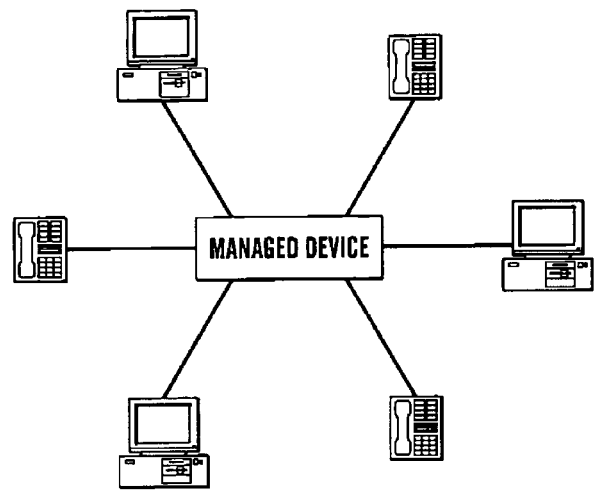
Fig.2
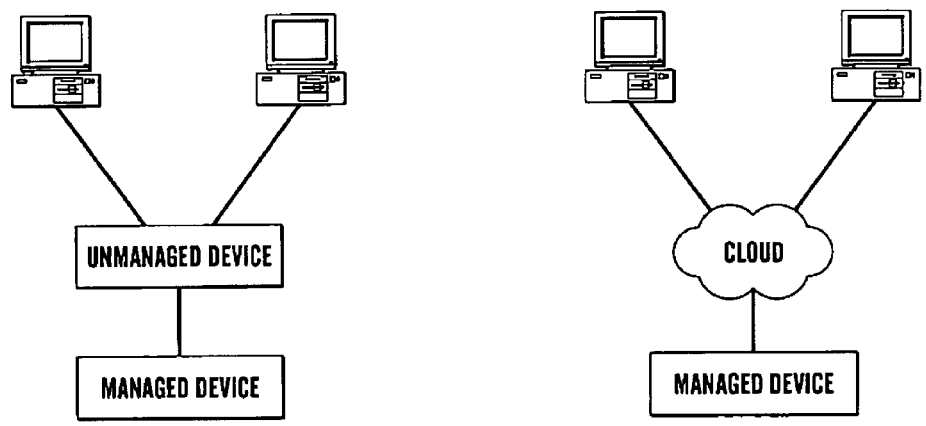
Fig.3a  Fig.3b

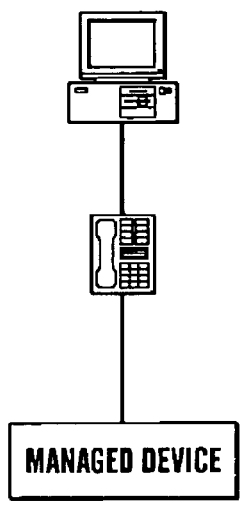 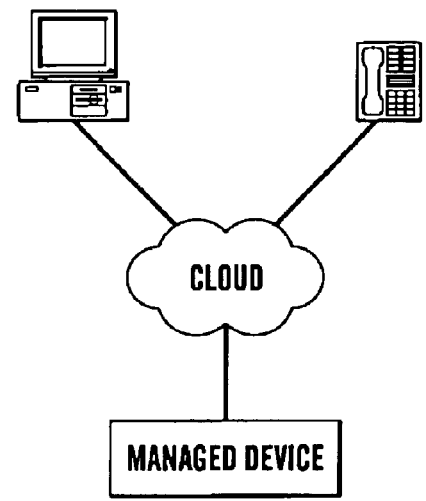
Fig.4a                    Fig.4b

DISCOVERY OF PHONES ON A NETWORK, SUCH AS A LAN

BACKGROUND OF THE INVENTION

The present invention relates to the discovery of devices such as Ethernet phones on a network such as a LAN (Local Area Network) or other network.

The present invention relates to the process of discovery of the devices on a network, that is a network of electronic devices comprising, for example, workstations, personal computers, servers, hubs, routers, bridges, switches, (hereinafter referred to as devices of the network), and links between these devices which may be in the form of physical cable or wireless links. The network may be a local area network (LAN), such as an Ethernet network, wide area network (WAN) or other types, including wireless networks, and may operate in accordance with any desired protocol.

Computers and other devices connected to a network may be managed or unmanaged devices. A managed device has processing capability which enables it to monitor data traffic sent from, received at, and passing through the ports of the device. Monitored data associated with the ports of the network device is stored in memory on the network device. For example, data relating to the origin of a data packet which is received at a port is stored along with the identity of the relevant port.

After such a network has been installed, it is desirable for the person appointed network manager to be able to understand the technical operation of the network. In known network management systems, the manner in which the relevant data is retrieved from the managed devices, compiled and displayed ("discovered") has been problematic in several respects. One problem is that the data does not provide information about unmanaged devices.

The topology of the network may be deduced by operation of the network manager's computer by the process of discovery in which each of the devices of the network are interrogated to thereby produce on a network manager's workstation details of the network and its operation, preferably in the form of a network map which may be displayed on a visual display unit showing the devices and links between the devices. At its simplest, and where the device is a "managed" device, this information is usually provided by interrogation using a known protocol, such as, but not limited to, the SNMP (Simple Network Management Protocol), of the so-called 'agent' of each device which stores the device's unique MAC address, the type of device and the MAC addresses embedded in the data passing into a particular port which thereby gives the MAC addresses of the origin of the data and hence the MAC address of the devices which are connected to the ports directly or indirectly.

It has recently been proposed to include so called Ethernet telephones in networks (particularly LANs), in addition to the usual workstations, routers and switches. These Ethernet telephones (which may be controlled by a telephone controller, usually a network call processor (NCP)) allow one to use the existing wiring or other network medium to implement a telephone system. This is particularly useful in a business environment where a single set of cables or other medium may be provided to connect both the computer network and the telephone network.

It is clearly desirable that the network manager of the computer network should be able to similarly view the availability and placement (i.e. the topology) of phones on this same network.

A particular difficulty in meeting this objective is that Ethernet phones may not be managed, that is they do not carry an agent as described above. Thus a typical discovery process will not be able to obtain sufficient information about the telephones for details of them to be available to the network manager. At best, they will appear as "generic" devices which have only a MAC address associated with them.

Furthermore, in a typical arrangement of Ethernet phones, a user's PC (personal computer) will be connected through the Ethernet phone to the same port of the network device. Typical discovery processes would simply see two MAC addresses on the same port of the network device, which it would know is impossible, and hence will either (a) highlight the error, or (b) just display them both connected to the port (which is incorrect), or (c) display some item such as a cloud between the port and the phone/PC.

SUMMARY OF THE INVENTION

The present inventions provides a method of discovery of devices on a network, which network comprises a plurality of devices, at least some of which are managed, at least one unmanaged phone and telephone controller, said method comprising establishing an address for the managed devices, the telephone controller and the or each said phone, establishing the type of each managed device in the network, determining which of the remaining devices are phones by accessing the relevant information in the discovered telephone controller by establishing correspondence between the or each said phone and its address, and using this information to provide a display of the topology of the network including the or each phone.

The present invention also provides a computer program on a computer readable medium or embodied in a carrier wave for use in discovery of devices on a network, which network comprises a plurality of devices, at least some of which are managed, at least one unmanaged phone, and a telephone controller, said computer program comprising:
  program step for establishing an address for the or each managed device;
  program step for establishing an address for the telephone controller;
  program step for establishing an address for the or each phone;
  program step for establishing the type of each managed device;
  program step for determining which of the remaining devices are phones by accessing the relevant information in the discovered telephone controller and establishing correspondence between the or each said phone and its address; and
  program step for using this information to provide a display of the topology of the network including the or each phone.

Furthermore the present invention may also provide a computer program on a computer readable medium or embodied in a carrier wave for use in discovery of devices on a network, which network comprises a plurality of devices, at least one of which is managed, at least one unmanaged phone, and a telephone controller, said computer program comprising:
  a program step to discover the network, including the managed devices, the telephone controller and to establish the MAC addresses of unmanaged phones;
  a program step to obtain information from the telephone controller containing an association of MAC address(es) to the or each phone (e.g. by loading a WEB page from the telephone controller and including a program step to parse the WEB page to establish correspondence between particular phones and their MAC addresses)

a program step to find ports of devices with MAC address of phones;

a program step to determine, in respect of a port on which a MAC address of a phone is present, if there is only a single MAC address;

if yes, a program step to display a phone icon and relevant details connected directly to the port;

if no, a program step to determine if there are two MAC addresses and if one is a phone;

if yes, a program step to provide a display of a device with the second MAC address connected to the network via an icon of the phone;

If no, a program step to display an unmanaged aggregator display cloud.

According to other aspects the invention provides a computer network comprising a plurality of devices, at least some of which are managed, at least one unmanaged phone and telephone controller, including means for establishing an address for the managed devices, the telephone controller and the or each said phone, means for establishing the type of each managed device in the network, means for determining which of the remaining devices are phones by accessing the telephone controller and by establishing correspondence between the or each said phone and its address, and means for using this information to provide a display of the topology of the network including the or each phone.

BRIEF DESCRIPTION OF THE DRAWINGS

A preferred embodiment of the invention will now be described by way of example only and with reference to the accompanying drawings in which:

FIGS. 2, 3A, 3B, 4A, 4B, show aspects of the view of part of the network to be described.

DESCRIPTION OF THE PREFERRED EMBODIMENTS

Figure 1:
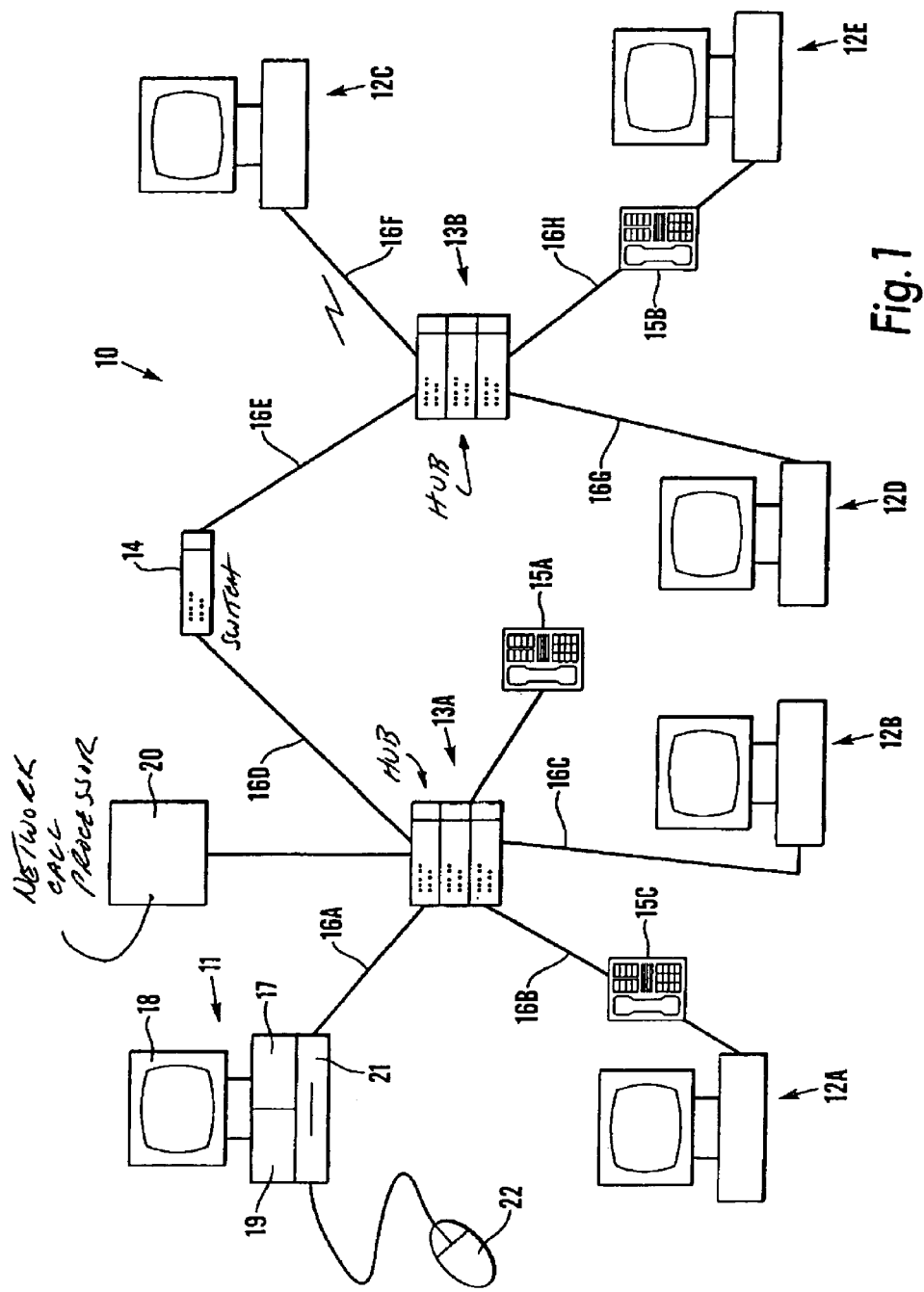
FIG. 1 is a diagrammatic view of a network incorporating a preferred embodiment of the invention.

Referring to FIG. 1 there is shown a physical network 10 comprising a plurality of devices in the form of a network supervisor's workstation or computer 11, other workstations 12B–E, hubs 13A, 13B, switch 14, Ethernet phones 15A–C, phone 15A being directly connected to hub 13A, and phone 15B, 15C being connected between hub 13B and workstation 12E and between hub 13A and workstation 12A respectively and a network call processor (NCP) 20 which operates the telephones 15 over the network. The network is a simple network and is set out for purposes of illustration only. Other configurations and arrangements, may be used.

The devices are connected together by means of links 16A–H which may be hard wired and utilise any desired protocol, and link 16F which is a wireless link.

The network supervisor's workstation includes, in addition to a visual display unit 18, a central processing unit or signal processor 19, a selector which may be in the form of a mouse 22, a program store 21 which may comprise, for example, a CD drive, a floppy disk drive or a zip drive, and a memory 17 for storing a program which may have been loaded from the program store 21 or downloaded for example via Internet from a website.

To discover the network, using a protocol such as SNMP, the network supervisor's computer 11 interrogates each device and analyse the network, and stores in the memory 17 the information relating to the devices within the network and the links between the devices. In essence, many devices include a so-called agent which stores information about the device such as its unique MAC number, its Sys Object ID (which identifies what the device is, what model type it is, how many ports it has and how they are connected), and the MAC address of the origin of the data which at least some of the ports have received and hence to which they are directly or indirectly connected. The computer 11 interrogates the agents of each device to obtain the said information.

In a preferred arrangement, the computer 11 may, on command from the selector 22, process signals from the memory 17 by the signal processor 19 and provide on the visual display unit 18 a network map showing each of the devices and the links therebetween. In the examples shown, the network is simple but of course in many instances the network will be considerably more complex and it may be necessary to arrange that the visual display unit 18 only shows a simplified version or only part of the network at any one time.

As mentioned above, however, whilst the network call processor 20 may support (i.e., communicate using) a protocol such as the SNMP protocol and hence will be discovered and placed by the computer 11 in its correct location on the network map, the Ethernet phones do not support the SNMP protocol. Thus discovering the network using SNMP (or indeed any other related protocol) will mean that the Ethernet phones will appear as unmanaged generic devices, in other words, the SNMP protocol will not allow for proper discovery of those phones. However although it does not know anything about these generic devices, in the case of Ethernet phones, it does establish their MAC address. The inventors of this invention have discovered that the identity and details of the Ethernet phones 15 can be deduced by using a different system to the rest of the network.

The NCP 20 is a processor which operates the telephone 15 and provides similar services provided by PBX telephone exchange in, for example an office network. The NCP 20 includes a memory which contains information (which may be in the form of a custom WEB page) containing a list of the telephones connected to the network, the MAC address of each telephone, the name of the person whose telephone it is, the extension number, etc. Thus, the NCP includes a telephone directory which includes the MAC addresses of each phone.

Figure 5:
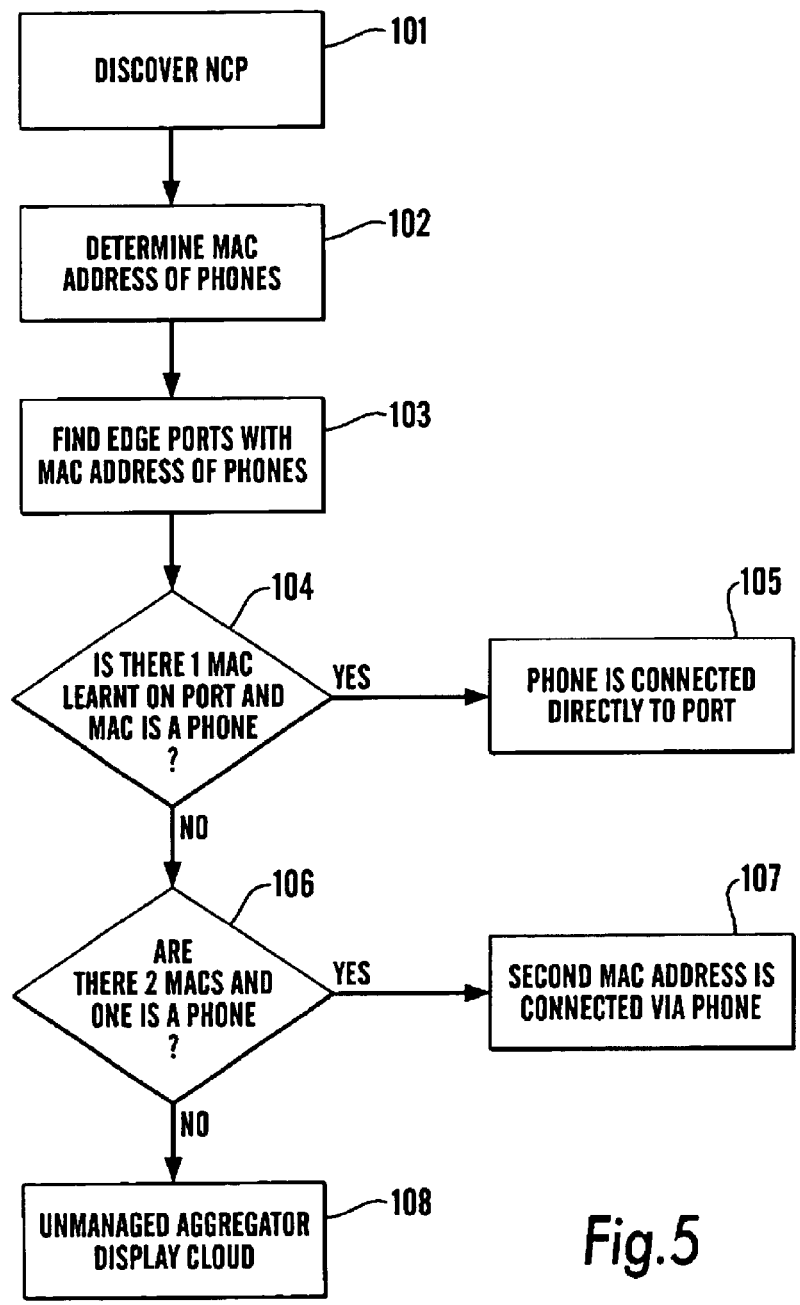
FIG. 5 is a flow chart of the method of discovery of the Ethernet phones on the network.

In order to discover the topology of the Ethernet phones in the network the network supervisor's computer 11 starts by using the steps set out in FIG. 5 to determine which MAC addresses belong to which phones (i.e. connects together the MAC addresses of each phone with the information stored on the telephone controller). For example, the WEB page in the telephone controller might typically be arranged so that there is provided a list, the first piece of information on each line being the phone number, the second person using the phone, and the third MAC address. The computer parses through the list and each time it comes to a MAC address (which it recognises from the layout), it then takes the previous two pieces of information for later use.

The initial step is to discover the network as described above and during that discovery process using SNMP it discovers the NCP 20. On discovering that there is an NCP, the computer 11 loads the WEB page from the NCP 20 which contains the list of phones etc. The computer 11 then uses HTML to parse (that is, search) the WEB page to extract the MAC address of each phone and the other information associated with each phone.

In the SNMP discovery process, as part of that process, the MAC addresses of components to which each port of each device is connected have been discovered and this then enables one to put together each telephone MAC address (which, as set out above, have been discovered) and the ports to which it is connected. Thus the discovery process determines where the MAC addresses of each phone have been seen on the network.

Devices with those MAC addresses are marked as being phones and are thus displayed on the network map as telephones and other information such as the name of the person whose phone it is, the extension number, etc may be associated with the phone icon on the network map.

However, there are other difficulties. There are at least two possibilities of the way in which the phone is connected to the network. As illustrated in FIG. 2 the Ethernet phones may be directly connected to a port of a managed device by a unique line and thus the process thus far described will produce a network map such as shown in FIG. 2 with sufficient information.

On the other hand, Ethernet phones generally have an input port and an output port and could be connected between a managed device and a PC. Thus in that case it will appear to the computer 11 during the discovery process that two or more devices are connected to a single port of a managed device and it can thus be concluded that the basic arrangement is as set out in FIG. 4A, that is between the managed device and the PC.

Referring to FIG. 3A, if two or more devices are connected to a managed device port via an unmanaged device then 2 or more MAC addresses will have been learnt on the managed device port and the rest of the topology algorithm will have been unable to locate where these MACs are connected to a single unique port. When this happens the topology algorithm assumes these devices, identified by their MAC addresses, are connected via an unmanaged device that the application is unable to discover and resolve. This ambiguity is represented with the two devices being connected via a cloud to the managed device port. (see FIG. 3B).

With the Ethernet telephones it is possible to connect a desktop device such as a PC to the network via the Ethernet phone (see FIG. 4A), so that the phone acts as an aggregator or single port hub. This has the advantage of not increasing the number of network connections required to deploy Ethernet Phones. However to keep the cost down phones are unmanaged devices. Hence Ethernet phones and devices connected in this piggy back manner will result in two MAC addresses being seen on the same port of the managed device, and will subsequently be resolved by the topology algorithm as being connected via an unresolved unmanaged aggregating device and hence will be displayed on the map connected to the managed device port via a cloud (See FIG. 4B).

During the discovery process one discovers the MAC addresses of the Ethernet phones on the network by interrogating the Network Call Processor (NCP). If there are 2 MACs learnt on a single port and one of them is the MAC address of a Ethernet phone, and the other is the MAC address of a non-phone device (e.g. a personal computer) then it is assumed that, the device uniquely identified by the other MAC is connected to the network via the phone and hence one can eliminate the cloud from the topology and map. (See FIG. 4A) The result is an accurate representation of the topology with respect to how the phones are connected to the LAN.

We have described how the network may be supervised. The preferred method of the invention is carried out under the control of the network supervisor's workstation or computer and in particular by means of a program controlling the processor apparatus of that computer or elsewhere in the system.

The program for controlling the operation of the invention may be provided on a computer readable medium, such as a CD, or a floppy disk, or a zip drive disk carrying the program or their equivalent, or may be provided on a computer or computer memory carrying the website of, for example, the supplier of the network products. The program may be downloaded from whichever appropriate source and used to control the processor to carry out the steps of the invention as described.

The program may include:— a program step (which may use a known protocol such as SNMP) to discover the network, including the managed devices, the NCP and to establish MAC addresses of unmananaged phones (FIG. 5, step 101);

a program step to change from SNMP to HTTP;

a program step to load a WEB page from the telephone controller;

a program step to parse the WEB page of the telephone controller to establish correspondence between particular Ethernet phones and MAC addresses (FIG. 5, step 102);

a program step to find ports with MAC address of phones (FIG. 5, step 103);

a program step to determine, in respect of port on which phone MAC address present, is there only single MAC address? (Step 104);

If yes, a program step display phone icon and relevant details connected directly to the port (Step 105);

If no, a program step to determine if there are two MAC addresses and only one is a phone? (Step 106);

If yes, a program step to provide icon of device with second MAC address connected to network via the phone (Step 107);

If no, a program step to display unmanaged aggregator display cloud (ie the situation cannot be resolved) (Step 108).

The invention is not restricted to the details of the foregoing example. For example, we have referred to HTML, MAC, SNMP and WEB but these are described as examples. Alternative protocols and arrangements will be apparent.

What is claimed is:

1. A method of discovery of devices on a network, which network comprises a plurality of devices, at least some of which are managed, at least one unmanaged phone, and a telephone controller, said method comprising the steps of:

establishing an address for each of the managed devices, the telephone controller, and said one phone so as to define a plurality of addresses;

establishing a type of each managed device in the network;

determining which of the remaining devices are phones by accessing relevant information in the telephone controller by establishing correspondence between said one phone and its address;

using said correspondence to provide a display of topology of the network including said one phone; and discovering and displaying the topology, wherein a single port of a managed device is connected to said one phone and a further non-phone device.

2. A method as claimed in claim 1 in which the telephone controller is accessed to obtain information stored in a memory of the telephone controller.

3. A method as claimed in claim 1 in which said addresses comprise MAC addresses.

4. A method as claimed in claim 1 further comprising the step of converting information relating to the devices, the telephone controller, and said one phone into a visual display on a visual display apparatus representing a physical relationship among the devices, the telephone controller and said one phone.

5. A computer program on a computer readable medium loadable into a digital computer, said computer program comprising software for performing the method of claim 1.

6. A computer program embodied in a carrier wave, said computer program comprising software for performing the method of claim 1.

7. A computer program on a computer readable medium or embodied in a carrier wave for use in discovery of devices on a network, which network comprises a plurality of devices, at least some of which are managed, at least one unmanaged phone, and a telephone controller, said computer program comprising:

program step for establishing an address for each of the managed devices;

program step for establishing an address for the telephone controller;

program step for establishing an address for said one phone;

program step for determining which of the remaining devices are phones by accessing relevant information in the telephone controller and establishing correspondence between each of said phones and its address;

program step for using said correspondence to provide a display of a topology of the network including said one phone; and discovering and displaying the topology, wherein a single port of a managed device is connected to an Ethernet phone and a further non-phone device.

8. A program as claimed in claim 7 in which the telephone controller is accessed to obtain information stored in a memory of the telephone controller.

9. A program as claimed in claim 7 in which said addresses comprise MAC addresses.

10. A program as claimed in claim 7 further comprising the program step of converting information relating to the devices, the telephone controller, and the telephones into a visual display on a visual display apparatus representing a physical relationship among the devices, the telephone controller and the phones.

11. A computer network comprising a plurality of devices, at least some of which are managed, at least one unmanaged phone, and a telephone controller, the network having:

means for establishing an address for each of the managed devices, the telephone controller and said one phone;

means for establishing a type of each managed device in the network, means for determining which of the remaining devices are phones by means for accessing relevant information in the telephone controller by establishing correspondence between each one phone and its address;

means for using said correspondence to provide a display of topology of the network including said one phone; and means for discovering and displaying the topology, wherein a single port of a managed device is connected to said one phone and a further non-phone device.

12. A computer network as claimed in claim 11 in which the telephone controller is accessed to obtain information stored in a memory of the telephone controller.

13. A computer program on a computer readable medium or embodied in a carrier wave for use in discovery of devices on a network, which network comprises a plurality of devices, at least one of which is managed, at least one unmanaged phone, and a telephone controller, said computer program comprising:

a program step to discover the network, including the managed devices, the telephone controller and to establish MAC addresses of unmanaged phones;

a program step to obtain information from the telephone controller containing an association of MAC addresses to each of said phones;

a program step to find ports of devices with MAC addresses of said phones; and a program step to determine, in respect of a port on which a MAC address of one of said phones is present, if there is only single MAC address;

if yes, a program step to display a phone icon and relevant details connected directly to the port; and if no, a program step to determine if there are first and second MAC addresses and if the first MAC address is associated with one of said phones;

if yes, a program step to provide a display of a device with the second MAC address connected to the network via an icon of the phone; and if no, a program step to display an unmanaged aggregator display cloud.

* * * * *